Patented June 26, 1945

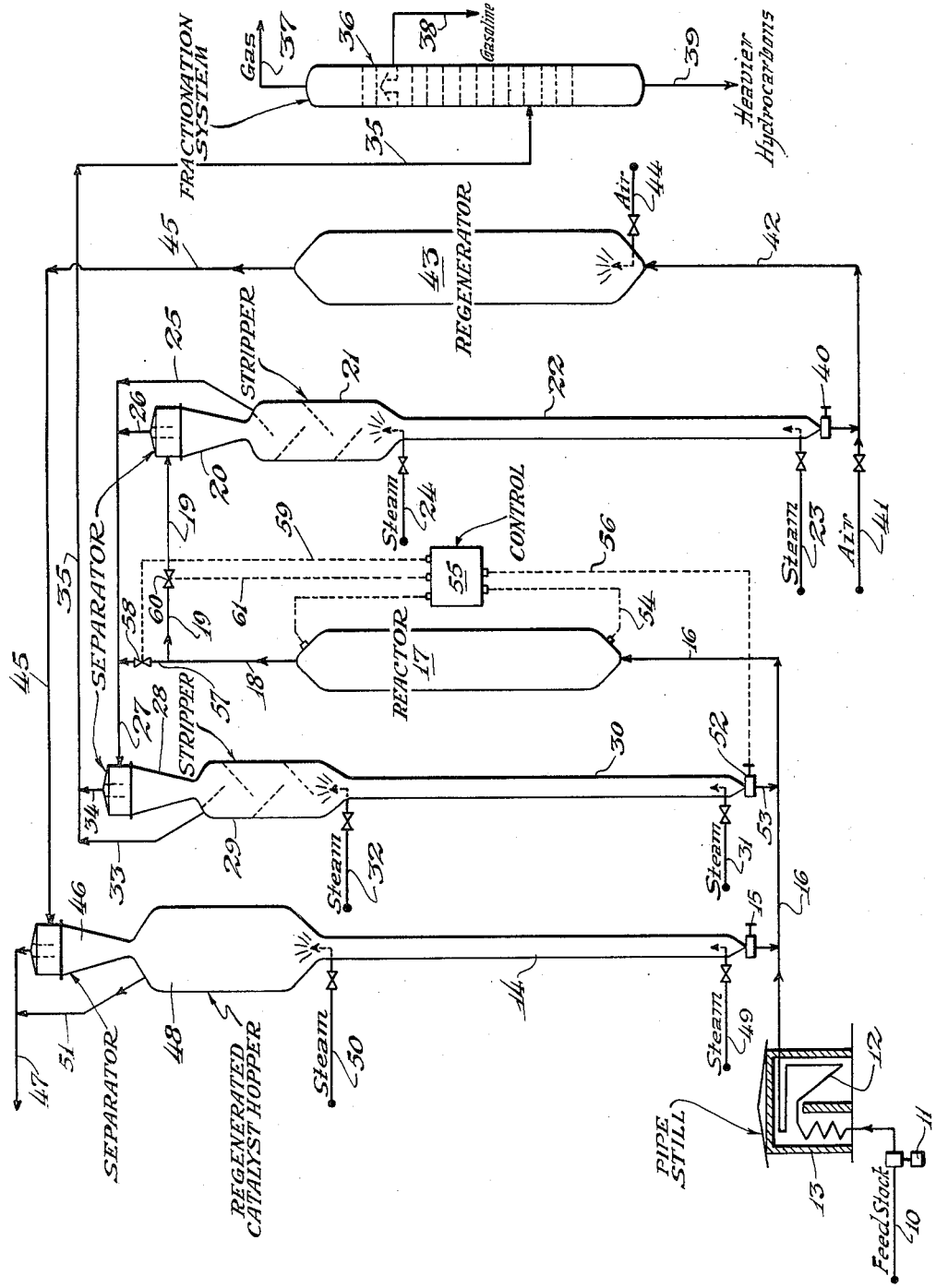

2,379,027

UNITED STATES PATENT OFFICE 2,379,027

CATALYTIC CONVERSION SYSTEM

Donald A. Monro, Flossmoor, Ill., assignor to Standard Oil Company, Chicago, Ill., a corporation of Indiana Application December 31, 1940, Serial No. 372,534

10 Claims. (Cl. 196—52)

This invention relates to catalytic conversion systems and it pertains more particularly to conversion systems of the so-called "fluid" type wherein a solid catalyst is employed for endothermic or exothermic reactions while suspended in an upwardly flowing gaseous or vapor stream. The invention is particularly directed to hydrocarbon conversion systems for the manufacture of high quality motor fuel.

In processes of catalytic cracking, hydrogenation, dehydrogenation, aromatization, reforming, isoforming, isomerization, alkylation, desulfurization, polymerization, etc. a hot vaporized hydrocarbon charging stock may be contacted with a solid catalyst while that catalyst is suspended in the upwardly flowing reaction vapor stream. During the reaction the catalyst becomes coated with a carbonaceous deposit which impairs its catalytic activity. The coated catalyst may be separated from reaction vapors and suspended in another upwardly flowing stream containing controlled amounts of oxygen and thus regeneration may be effected by burning off the carbonaceous deposit while the catalyst is suspended in hot regeneration gas.

An important consideration in both the reaction and regeneration steps is the density of the suspended catalyst in the gaseous or vapor supported medium. It is essential in the reaction step that vapors contact a sufficient amount of catalyst for a sufficient period of time to effect the desired reaction.

The catalyst employed may be granular, powdered or pelleted solids of a particle size ranging from about 10 to 400 mesh, preferably about 200 to 400 mesh and preferably of fairly uniform size. When such catalyst is introduced at a fairly constant rate in the base of a vertical reactor wherein there is an upwardly flowing gas or vapor stream and the superficial velocity of said stream is varied it will be found that at high velocities the catalyst moves through the reactor at substantially the same velocity as the vapor stream, i. e., there is not a great tendency towards settling. At very low superficial vapor velocities through the reactor the catalyst may settle out of the vapors and assume a quiescent state. At intermediate vapor velocities the catalyst will be carried upwardly with the gas stream but there will be a pronounced tendency toward settling or slipping, i. e., the catalyst will move upwardly in the reactor at a much lower velocity than the supporting stream.

It has been found that with ordinary powdered catalyst ranging in particle size from about 200 to about 400 mesh the catalyst is uniformly distributed throughout the gas stream when the gas stream velocities are in excess of about 5 feet per second, the catalyst particles being suspended as individual particles in a continuous phase of gas. When the superficial gas velocity is decreased to about 2 feet per second the concentration of catalyst in the reactor rapidly increases and the catalyst takes on a "boiling" appearance in which "bubbles" of gas flow upwardly through a liquid-like, "dense catalyst phase" in a manner similar to the upward flow of air through a body of water. The catalyst takes on the appearance of a new phase, a dense suspended catalyst phase which may have a density of 10 to 20 pounds per cubic foot. This dense phase becomes more pronounced and more clearly defined as the gas velocity is further decreased but if the gas velocity is sufficiently decreased portions of the catalyst will become quiescent and those portions of the dense phase will no longer behave as a liquid. In order to maintain a liquid-like "dense phase" condition the vapor velocity should be at least .2 foot per second and preferably about 1 to 2 feet per second. The velocity required for such dense phase conditions is dependent of course upon the particle size and weight of the catalyst, the diameter of the reactor and perhaps to some extent on the viscosity of the gas or vapor stream although the viscosity of this stream is not of as great significance as has heretofore been assumed.

It appears that when superficial vapor velocities in a reactor are so controlled as to provide a dense liquid-like catalyst phase there is actually a rough interface between this lower dense catalyst phase and an upper rarefied phase. Apparently there is some force such as static electricity or surface energy which acts between closely adjacent particles and holds the powdered catalyst in the dense phase condition. The gas which bubbles through this dense phase sweeps catalyst particles therefrom into the upper gas phase and when such particles become dispersed therein they are subject to the laws of behavior as individual particles. With the introduction of catalyst into the dense phase at the same rate at which it is being removed from the top of the dense phase it is possible to maintain a constant level of catalyst in the reactor and to operate in a condition of dynamic equilibrium.

It might be assumed that with such low vapor velocities there would be a tendency toward classification, i. e., for the heavier catalyst particles to settle and escape withdrawal from the upper surfaces. It has been found, however, that with a superficial gas velocity of about ½ to 2 feet per second as much as 40% of 30 to 40 mesh particles can be added to the powdered catalyst without the occurrence of such classification. After equilibrium has been reached the heavier particles appear to be swept along in the eddies of relatively dense aerated catalyst and to be drawn from the surface of the dense phase at the same rate as they are being introduced thereto.

A very important feature of the dense phase operation is the uniform temperature which exists throughout all parts thereof. Here again the dense phase apparently behaves like a liquid in which there is sufficient turbulence and convection currents to obtain thorough and intimate mixing so that although gases may be introduced at a temperature of 950° F. the entire dense phase may be at a temperature that is very close to 925° F. when cracking is being effected in a dense phase reactor. Similarly, regeneration temperatures are uniform throughout the entire dense phase and relatively cold gases which are introduced with the oxygen may maintain any substantially uniform regeneration temperature by absorbing the exothermic heat as fast as it is liberated.

In a commercial conversion system employing the above described fluid-type up-flow reactor for solid catalysts the size and cross-sectional area of the reactor can be determined for obtaining a particular vapor velocity, catalyst density, and catalyst residence time in the reactor for any given catalyst, charging stock, and specific reaction conditions. If dense phase operations are desired the rough interface between the dense and rarefied vapors is preferably near the top of the reactor. While the reactor is on-stream there may be a surging within the reactor accompanied by an instantaneous or gradual discharge from the reactor of a much larger quantity of catalyst than is being introduced at the base thereof. This results in an instantaneous or gradual reduction of the amount of catalyst in the reactor which, in turn, results in the treatment of the hydrocarbon vapors with a lesser amount of catalyst than desired for optimum conversion. Furthermore, this surging or gradual thinning out of the dense phase embodies an unduly heavy load on the cyclone separators as heretofore used. It also results in an undue increase in the amount of catalyst in the regeneration part of the system and thus causes the entire system to become unbalanced. An object of my invention is to prevent these operating difficulties.

A further object of my invention is to provide a method and means for maintaining a substantially uniform amount of catalyst in a reactor without altering the fresh or regenerated catalyst-to-oil weight ratio in the entering stream or streams. It is not only desirable to maintain a constant amount of catalyst in the reactor but it is also desirable to maintain that catalyst at the same average activity. Fresh or regenerated catalyst is more active than partially spent catalyst. The relationship between the amount of catalyst in the reactor and the average residence time of the catalyst in the reactor for catalytic cracking to a given degree may be expressed by the following formula:

$$T = at^{.534}$$

where "$T$" is tons of catalyst in the reactor per hundred barrels of stock charged thereto per hour, "$a$" is a constant ranging within the limits .3 to 3.0, preferably about 1.2 dependent upon the amount of gasoline desired, catalyst activity, etc. and "$t$" is catalyst residence time in minutes. An object of my invention is to maintain a substantially uniform catalyst residence time in the reactor as well as a substantially uniform amount of catalyst in the reactor during the conversion.

A further object is to provide an improved method and means for automatically controlling catalyst density in a reactor and for maintaining this catalyst density at a definite value between about 1 to 35 pounds per cubic foot, preferably between about 10 to 20 pounds per cubic foot. Other objects will become apparent as the detailed description of the invention proceeds.

In practicing my invention I recycle to the reactor the amount of partially spent catalyst discharged from the top of the reactor which is in excess of the fresh or regenerated catalyst introduced at the base thereof. This recycled partially spent catalyst is of substantially the same activity as the catalyst in the reactor and by recycling such catalyst externally of the reactor I can effectively compensate for any catalyst surges or for any thinning out of the catalyst which would otherwise upset equilibrium conditions in the reactor.

Preferably I provide a system for separating from reaction vapors an amount of catalyst which is equivalent to the amount of fresh or regenerated catalyst charged to the reactor. Any additional catalyst is either by-passed around this separation system or is carried by vapors leaving said system to a second separator system wherein excess catalyst is knocked out of the vapors and returned to the reactor. Automatic means may be provided for increasing the amount of this partially spent catalyst recycled to the reactor in accordance with decrease in catalyst density in the reactor.

The invention will be more clearly understood from the following detailed description and from the accompanying drawing which forms a part of this specification and which is a flow diagram schematically illustrating a preferred embodiment of the invention.

The invention is applicable to a wide variety of processes but it will be described as applied to a process of catalytic cracking. The charging stock for such process may be a gas oil or heavier hydrocarbon from petroleum or from synthetically produced hydrocarbons—such as oils produced by the Fischer process of carbon monoxide-hydrogen synthesis or produced by the hydrogenation of carbonaceous materials. In the example I will describe the catalytic cracking of 35° A. P. I. gravity Mid-Continent gas oil.

The catalyst for this process may be an activated clay such as the acid treated bentonite commercially marketed as Super Filtrol. Alternatively, it may be a synthetic catalyst of the silica-alumina or silica-magnesia type. Such a catalyst may be prepared by depositing alumina or alumina and zirconia on silica gel or by incorporating these or other metal oxides in silica gel, for instance, by forming the silica gel itself in a solution of aluminum and zirconium salts, washing, drying and heating. An excellent catalyst may be prepared by ball milling calcined magnesia and silica gel with sufficient water to form a paste or doughy mass which is then dried and heated to about 1000° F. The best catalysts for catalytic cracking are the metal oxide type—particularly the silica-metal-oxide type.

I employ the catalysts in the form of a powder ranging in particle size from 20 to 400 mesh, preferably from 200 to 400 mesh. Such a powder in compacted form has a density of about .7, i. e., it weighs about 40 to 45 pounds per cubic foot. When aerated at a gas velocity of about .05 to .2 feet per second, the catalyst becomes fluent and may have a density of about 20 to 40 pounds per cubic foot. At a gas or vapor velocity of about .3 to 3 feet per second, preferably 1 to 2 feet per second, the catalyst density may be about 10 to 20 pounds per cubic foot. I prefer to employ catalyst densities in my reaction and regeneration zones of about 1 to 35 pounds per cubic foot, more particularly about 10 to 20 pounds per cubic foot, and the vapor velocities in the reactor should be so adjusted as to produce such densities.

Referring to the drawing the gas oil charge is introduced through line 10 by pump 11 to coils 12 of pipe still 13 wherein it is vaporized and heated to give a transfer line temperature of about 800 to 1100° F., preferably about 950° F., at a pressure of about atmospheric to 50 pounds per square inch, preferably about 10 to 15 pounds per square inch. Even lower oil temperatures may be used when high ratios of hot catalyst-to-oil are used. Powdered catalyst from standpipe or catastat 14 is introduced in amounts regulated by slide valve, star feeder or other equivalent means 15 into transfer line 16 where it further heats the oil which discharges into the base of reactor 17. It should be understood, of course, that the catalyst may be introduced directly into reactor 17 by means of steam or any other suitable injection means. The catalyst-to-oil weight ratio is preferably about 1:1 to 5:1, for example, about 3:1 and the catalyst temperature should be about the same or preferably a little higher temperature than the temperature of the vapors at the point of introduction.

Reactor 17 is of such size and cross-sectional area as to provide the necessary amount of catalyst for effecting the conversion at the selected vapor velocities which are preferably .3 to 3 feet per second. For catalyst holding time in the reactor for about 3 minutes the oil contact time may be about 10 seconds for obtaining about 40 to 45% conversion. Generally speaking, the time of oil contact may range from about 2 to 40 seconds or more, and the catalyst residence time may range from a few seconds to a matter of hours. My invention is not limited to any particular reaction conditions.

Vapors carry catalyst from the top of the reactor 17 through line 18 and line 19 to cyclone separator 20 which is designed to remove about the same amount of solids from gases as are introduced into the system by feeding means 15. The removed catalyst falls to stripper column 21 and thence to standpipe or catastat 22. Suitable aerating gas such as steam may be introduced through line 23 in sufficient amounts to maintain the catalyst in fluent form in the standpipe which in the present case is effected with gas velocities of about .05 to .2 feet per second (or higher with coarse catalyst) in the standpipe. Additional stripping or aerating gas, such as steam, may be introduced through line 24. These gases are removed from the top of the stripper through line 25.

Vapors from line 25 together with vapors leaving the top of separator 20 through line 26 are introduced through line 27 into cyclone separator 28. The remaining catalyst which is suspended in these vapors is removed therefrom in separator 28 and discharged into stripper column 29 and standpipe or catastat 30 which may be aerated at its base by gas introduced through line 31. Stripping steam or aerating gas may also be introduced by line 32. These stripping or aerating gases are removed from the top of tower 29 through line 33.

Gases and vapors from line 33 and reaction products leaving the top of separator 28 through line 34 are introduced through line 35 to any conventional fractionation system 36 from which gases may be vented through line 37, gasoline may be withdrawn through line 38 and heavier-than-gasoline hydrocarbons through line 39.

Spent catalyst from the base of catastat 22 is discharged through slide valve, star feeder or other conventional means 40, picked up by an oxygen-containing gas such as air from line 41 and conveyed through line 42 to the base of regenerator chamber 43. It should be understood, of course, that the catalyst may be introduced directly into the regenerator by means of steam or any other inert gas or by any other conventional means. Some or all of the oxygen-containing gas for effecting regeneration may be introduced at the base of the regenerator through line 44.

The regenerator may be an up-flow chamber of the same general type as chamber 17 and should be of sufficient size and cross-sectional area to provide the necessary holding time and contact with sufficient oxygen to effect the desired combustion of carbonaceous deposit from catalyst particles. The temperature may be controlled in this regenerator by the recycling of relatively cool regenerated catalyst, by the use of heat exchange coils in the regenerator itself or by any other conventional means. The safe temperature limits will vary with different catalysts but for the catalyst of the type hereinabove described I prefer to avoid any temperatures in excess of 1050 or 1100° F. and I prefer to effect the regeneration at a temperature of about 1000° F. Here again I prefer to employ such gas velocities as to maintain a catalyst density in the regenerator of about 1 to 35 pounds per cubic foot, preferably about 10 to 20 pounds per cubic foot.

Regenerated catalyst is carried out of the top of the regenerator through line 45 by hot regeneration gases at about the same rate that catalyst is introduced to the regenerator. The catalyst is separated from regeneration gases in cyclone separator 46 from which the hot regeneration gases are discharged through line 47. It should be understood that any number of cyclone separators may be used in place of the single separators herein described and that any other conventional means may be employed for separating gases or vapors from the solid catalyst particles. Heat and residual catalyst may be recovered from regeneration gases in line 47 by means of waste heat boilers, scrubbers, etc.

Regenerated catalyst drops from separator 46 into hopper 48 from which it falls into catastat 14. An inert aerating gas is introduced at the base of this catastat through line 49 and at the base of the hopper through line 50, the aerating gas being withdrawn from the top of hopper 48 through line 51.

I have already described how any excessive amount of catalyst which is discharged from the top of reactor 17 is carried by vapors leaving separator 20 through line 26 or by stripping gases leaving stripper 21 through line 25 through line 27 to separator 28. This spent or partially spent catalyst is immediately returned to the reactor in amounts regulated by star feeder or other equivalent means 52 and line 53 via transfer line 16 or it may be directly introduced into the base of the reactor by any conventional injection or introduction means.

The amount of catalyst in the reactor may be determined by the pressure differential between the top and bottom of said reactor. This pressure differential may be determined by a conventional manometer or pressure indicating means 54. A control box 55 may be provided with pneumatic, mechanical or electrical valve actuating mechanisms which are controlled by the pressure differential in the reactor. One connection 56 from such mechanism may control the position of valve 52 so that when the pressure differential in reactor 17 decreases below a certain limit valve 52 will be opened to increase the amount of spent or partially spent catalyst introduced into the reactor and thus maintain the desired total amount of catalyst in the reactor for optimum conversion conditions.

Instead of introducing all of the reaction products and suspended catalyst from line 18 through line 19 to separator 20 I may by-pass a part of the reaction products and suspended catalyst through line 57 directly to separator 28. The amount of catalyst so by-passed may be controlled by valve 58 which is controlled by an operative connection 59 to control box 55. Alternatively a valve 60 in line 19 may be controlled by operative connection 61. In some cases it may be desirable to employ valves in both lines 19 and 57. In any case if there is any surging or gradual thinning out of the catalyst in reactor 17 this will immediately be indicated by a change in pressure differential and this change in pressure differential will automatically actuate the necessary valves for returning excess catalyst via separator 28 and columns 29 and 30 to the base of the reactor. The catalyst which is thus returned is of about the same average activity as the catalyst in the reactor itself so that both the amount and average activity of the catalyst is held substantially constant in the reactor.

Instead of or in addition to the use of by-pass line 57 I may regulate the amount of catalyst returned to the reactor via columns 29 and 30 by changing the amount of steam or aerating gas introduced through line 24 and the introduction of aerating gas at this point may likewise be controlled by the pressure differential across the reactor or by any equivalent means.

It should be noted that by controlling the average catalyst density in the reactor and hence the total amount of catalyst in the reactor by recycling any excessive amounts of catalyst discharged therefrom I do not unbalance any of the parts of the system. No undue load is placed on the regenerator because of temporary surges or a gradual thinning out of the catalyst in the reactor. Vapor velocities in the reactor remain substantially constant and any unavoidable variations therein may be compensated for by the recycling of excess catalyst which is discharged from the reactor because of such variations. I have thus obtained the object of my invention and provided a means for maintaining or increasing the catalyst-to-oil ratio in the reactor without at the same time appreciably altering the overall catalyst activity therein. My system is also useful for moderating the overall activity of a relatively active powdered catalyst.

A similar catalyst recycling system may be employed on the regeneration side in which case the recycled regenerated catalyst is preferably cooled before reintroduction into the regenerator in order to obtain the desired temperature control. Alternatively regenerated catalyst may be withdrawn from the base of catastat 14, partially cooled and then injected into regenerator 43 in amounts and at such temperatures as to effect the desired temperature control. Likewise I may use a single standpipe or catastat in place of catastats 22 and 30 and recycle the necessary amount of catalyst to the reactor through one line corresponding to line 53 while charging another stream of the spent catalyst to the regenerator through another line corresponding to line 42.

While I have described a preferred embodiment of my invention it should be understood that I do not limit myself to any of the details hereinabove described and that modifications and alternative methods will be apparent to those skilled in the art from the above description.

I claim:

1. The method of operating a catalytic conversion system which comprises vaporizing and heating a charging stock to reaction temperature, introducing said vaporized and heated charging stock into the base of an up-flow reaction zone together with regenerated catalyst, maintaining a catalyst density in said reactor of at least about 10 pounds per cubic foot and maintaining an interface between a dense phase of suspended catalyst in the lower part of said reactor and a rarified phase in the upper part of said reactor, withdrawing reaction vapors and catalyst from the top of said reactor, separating withdrawn catalyst from reaction vapors in a plurality of separation zones, regenerating catalyst from one of said separation zones for further introduction into the base of said reactor and returning separated catalyst from the other separation zone to the base of said reactor without regeneration and in such amounts as to maintain a substantial constant amount of catalyst in said reaction zone.

2. In a catalytic conversion system, means for vaporizing the charging stock and heating it to reaction temperature, an up-flow reactor, means for introducing regenerated catalyst and heated charging stock vapors at the base of said reactor at such a rate as to obtain a catalyst density in said reactor of about 1 to 35 pounds per cubic foot, a first catalyst separator and a stripper, means for introducing at least a part of the reaction products and suspended catalyst from said reactor to said first separator, and for discharging catalyst from said first separator to said stripper, a second separator, means for introducing gases and vapors together with suspended catalyst from said first separator to said second separator, a fractionation system for separating gasoline from lighter and heavier hydrocarbons, means for introducing gases and vapors from said second separator to said fractionation system, a catalyst regenerator, means for passing catalyst from said stripper through said regenerator and thence to the base of said reactor and means for passing unregenerated catalyst from said second separator to the base of said reactor.

3. The apparatus of claim 2 which includes means for passing a part of the reaction products and suspended catalyst from said reactor directly to said second separator.

4. The apparatus of claim 2 which includes means for indicating the amount of catalyst in the reactor and means responsive thereto for regulating the amount of catalyst introduced from said second separator to the base of said reactor.

5. The apparatus of claim 2 which includes means for introducing a part of the reaction vapors and suspended catalyst from the reactor directly to the second separator, means for indicating the amount of catalyst in the reactor and means responsive to said last named means for regulating the amounts of reaction products and suspended vapors which are introduced into said first and said second separators respectively.

6. The apparatus of claim 2 which includes means for introducing an aerating gas into said stripper and means for regulating the amounts of gas so introduced.

7. The method of operating a catalytic conversion system which comprises introducing a vaporized charging stock at the base of an upflow contacting zone containing finely-divided solid catalyst particles, maintaining an upward vertical vapor velocity in said zone within the approximate range of .3 to 3 feet per second and sufficiently low to produce a dense turbulent suspended catalyst phase in the lower part of the contacting zone and a rarefied catalyst phase in the upper part thereof, continuously introducing regenerated catalyst into said contacting zone and continuously withdrawing catalyst from said contacting zone, passing withdrawn catalyst through a regeneration zone and thence back to the contacting zone during portions of the contacting time characterized by lack of surging and catalyst depletion in the contacting zone, the amount of catalyst withdrawn not being in excess of the amount of regenerated catalyst introduced into said contacting zone during such time, and recycling a part of the withdrawn catalyst directly to the contacting zone without regeneration during other portions of the contacting time when surging in the contacting zone has caused a depletion of the amount of catalyst therein.

8. The method of claim 7 wherein the amount of catalyst which is recycled without regeneration is controlled in accordance with the pressure differential between upper and lower points in the contacting zone.

9. In a powdered catalyst conversion system wherein powdered catalyst is suspended in charging stock vapors which are passing upwardly through a contacting zone at a sufficiently low vertical velocity to produce a dense liquid-like suspended catalyst phase in the lower part thereof and a rarefied catalyst phase in the upper part thereof and wherein from time to time there are periods of surging in the contacting zone which results in undesirable decreases in catalyst density in said zone and a depletion of the total amount of catalyst in said zone, the method of operation which comprises continuously introducing regenerated catalyst into said zone at a substantially constant rate, continuously separating catalyst from vapors withdrawn from the contacting step, passing the separated catalyst to a regeneration zone during that portion of the operating time when the amount of separated catalyst is substantially equal to the amount of regenerated catalyst introduced into the contacting zone, recycling a portion of the separated catalyst without regeneration directly to the contacting zone during that portion of the operating time when the amount of separated catalyst exceeds the amount of regenerated catalyst introduced into the contacting zone and controlling the amount of separated catalyst returned without regeneration to maintain a substantially constant amount of catalyst of substantially constant activity in the contacting zone throughout the entire contacting period.

10. The method of operating a powdered catalyst conversion system which method comprises maintaining a first pressuring column of regenerated catalyst, dispersing catalyst from the base of said column into a stream of charging stock vapors whereby the catalyst is suspended in said stream and carried thereby to a substantially vertical contacting zone, passing said vapors upwardly in said contacting zone at a sufficiently low velocity to effect the formation of a dense turbulent suspended catalyst phase at the base thereof and a rarefied catalyst phase in the upper part thereof, said dense phase being subject to surging and a discharge of catalyst at a greater rate than that at which catalyst is introduced thereto, separating catalyst from vapors leaving the upper part of said contacting zone and accumulating a part of said separated catalyst in a second pressuring column and another part of said separated catalyst in a third pressuring column, the part of said separated catalyst accumulated in said second pressuring column being that part discharged on account of surging, returning catalyst from the base of the second pressuring column directly to the contacting zone without regeneration, introducing the catalyst from the base of the third pressuring column to a regeneration zone, regenerating catalyst in said regeneration zone, returning regenerated catalyst to said first pressuring column, maintaining a substantially constant weight ratio of regenerated catalyst from the first pressuring column to charging stock vapors entering the contacting zone, and controlling the amount of catalyst introduced from the second pressuring column into the contacting zone to maintain a substantially constant amount of catalyst of a substantially constant activity in said contacting zone.

DONALD A. MONRO.